United States Patent
Zhang et al.

(10) Patent No.: US 12,495,611 B1
(45) Date of Patent: Dec. 9, 2025

(54) DISPLAY PANEL, CONTROL METHODS, AND DISPLAY DEVICE

(71) Applicants: Wuhan Tianma MicroElectronics Co., Ltd. Shanghai Branch., Shanghai (CN); Wuhan Tianma Micro-Electronics Co., Ltd., Wuhan (CN)

(72) Inventors: Peng Zhang, Shanghai (CN); Yuantao Wu, Shanghai (CN); Wei Liu, Shanghai (CN)

(73) Assignees: Wuhan Tianma MicroElectronics Co., Ltd. Shanghai Branch, Shanghai (CN); Wuhan Tianma Micro-Electronics Co., Ltd., Wuhan (CN)

(*) Notice: Subject to any disclaimer, the term of this patent is extended or adjusted under 35 U.S.C. 154(b) by 0 days.

(21) Appl. No.: 19/084,028

(22) Filed: Mar. 19, 2025

(30) Foreign Application Priority Data

Dec. 10, 2024 (CN) .......................... 202411813982.6

(51) Int. Cl.
 G09G 3/00 (2006.01)
 G06F 3/041 (2006.01)
 H10D 86/40 (2025.01)

(52) U.S. Cl.
 CPC ......... *H10D 86/441* (2025.01); *G06F 3/0412* (2013.01); *G06F 3/04164* (2019.05); *G09G 3/006* (2013.01); *G09G 2330/12* (2013.01)

(58) Field of Classification Search
 CPC .... G06F 3/04164; G06F 3/0412; G09G 3/006
 See application file for complete search history.

(56) References Cited

U.S. PATENT DOCUMENTS

2021/0225216 A1* 7/2021 Wang .................. G09G 3/006

FOREIGN PATENT DOCUMENTS

| CN | 114546152 A | 5/2022 |
|---|---|---|
| CN | 115576444 A | 1/2023 |

* cited by examiner

*Primary Examiner* — Kevin M Nguyen
(74) *Attorney, Agent, or Firm* — Anova Law Group, PLLC

(57) ABSTRACT

A display panel, its control methods, and a display device are provided. Conventional array MUX test circuits of display panel are reused and improved. In a target unit, there is at least one connection path between a first solder pad and a first switch that contains a second switch connected in series. An end of a touch signal line is electrically connected with a first terminal of the first switch in the connection path where the second switch is connected in series. When the display panel performs touch functions, the second switches are controlled in an off state and the data signal lines are short-circuited. Further, based on the array MUX test circuit, a driver chip sends touch signals to touch signal lines to implement touch functions. Narrow bezel designs of display panels are achieved without adding new MUX circuits.

19 Claims, 22 Drawing Sheets

DISPLAY PANEL, CONTROL METHODS, AND DISPLAY DEVICE

CROSS-REFERENCE TO RELATED APPLICATION

This application claims the priority of Chinese Patent Application No. 2024118139826, filed on Dec. 10, 2024, the content of which is incorporated herein by reference in its entirety.

TECHNICAL FIELD

The present disclosure generally relates to the field of display technology and, more particularly, relates to display panels and control methods thereof, and display devices.

BACKGROUND

Narrow bezel display panels have become one of the development trends of high-end display panels due to simplicity, beauty, and high screen-to-body ratio. However, the advance of narrow bezel technology has reached a bottleneck, and it has become particularly difficult to further shrink the bezel of display panels and improve product specifications. In the lower bezel of a display panel, the height of the fanout area (also known as the fan-out area) cannot be ignored, which has become one of the difficult factors restricting the progress of narrow bezel display panels.

The disclosed structures and methods are directed to at least partially alleviating one or more problems set forth above and solving other problems in the art.

SUMMARY

One aspect of the present disclosure provides a display panel that includes an array MUX test circuit, a driver chip, data signal lines, touch signal lines, and second switches. The array MUX test circuit includes first solder pads, second solder pads, first switches, and N clock signal input terminals. N is a positive integer larger than or equal to two. A target unit includes N first solder pads, N first switches, and a second solder pad. The N first solder pads are electrically connected to first terminals of the N first switches in the target unit in a one-to-one correspondence. Second terminals of the N first switches are each electrically connected to the second solder pad. Control terminals of the N first switches are electrically connected to the N clock signal input terminals in a one-to-one correspondence. An end of the data signal line is electrically connected to a first solder pad. The other end of the data signal line extends to a display area of the display panel. In the target unit, there is at least one connection path between a first solder pad and a first switch and the at least one connection path includes a second switch connected in series. One end of the touch signal line is electrically connected to a first terminal of a first switch in a target connection path. The target connection path is a connection path that includes a second switch connected in series and there is at least one target connection path in the target unit. The other end of the touch signal line extends toward the display area of the display panel and is electrically connected to a touch electrode block. The driver chip is electrically connected to the array MUX test circuit through the second solder pad. In a touch driving mode of the display panel, the second switches are in an off state and the driver chip sends touch signals to the touch signal lines, respectively.

In another aspect of the present disclosure, a method for controlling a display panel is provided. The display panel includes an array MUX test circuit, a driver chip, data signal lines, touch signal lines, and second switches. The array MUX test circuit includes first solder pads, second solder pads, first switches, and N clock signal input terminals. N is a positive integer larger than or equal to two. A target unit includes N first solder pads, N first switches, and a second solder pad. The N first solder pads are electrically connected to first terminals of the N first switches in the target unit in a one-to-one correspondence. Second terminals of the N first switches are each electrically connected to the second solder pad. Control terminals of the N first switches are electrically connected to the N clock signal input terminals in a one-to-one correspondence. An end of the data signal line is electrically connected to a first solder pad. The other end of the data signal line extends to a display area of the display panel. In the target unit, there is at least one connection path between a first solder pad and a first switch and the at least one connection path includes a second switch connected in series. One end of the touch signal line is electrically connected to a first terminal of a first switch in a target connection path. The target connection path is a connection path that includes a second switch connected in series and there is at least one target connection path in the target unit. The other end of the touch signal line extends toward the display area of the display panel and is electrically connected to a touch electrode block. The driver chip is electrically connected to the array MUX test circuit through the second solder pad. In a touch driving mode of the display panel, the second switches are in an off state and the driver chip sends touch signals to the touch signal lines, respectively. The method includes in a touch driving mode of the display panel, controlling the second switches to be in an off state, and controlling the driver chip to send touch signals to the touch signal lines.

In another aspect of the present disclosure, a display device includes a display panel. The display panel includes an array MUX test circuit, a driver chip, data signal lines, touch signal lines, and second switches. The array MUX test circuit includes first solder pads, second solder pads, first switches, and N clock signal input terminals. N is a positive integer larger than or equal to two. A target unit includes N first solder pads, N first switches, and a second solder pad. The N first solder pads are electrically connected to first terminals of the N first switches in the target unit in a one-to-one correspondence. Second terminals of the N first switches are each electrically connected to the second solder pad. Control terminals of the N first switches are electrically connected to the N clock signal input terminals in a one-to-one correspondence. An end of the data signal line is electrically connected to a first solder pad. The other end of the data signal line extends to a display area of the display panel. In the target unit, there is at least one connection path between a first solder pad and a first switch and the at least one connection path includes a second switch connected in series. One end of the touch signal line is electrically connected to a first terminal of a first switch in a target connection path. The target connection path is a connection path that includes a second switch connected in series and there is at least one target connection path in the target unit. The other end of the touch signal line extends toward the display area of the display panel and is electrically connected to a touch electrode block. The driver chip is electrically connected to the array MUX test circuit through the second solder pad. In a touch driving mode of the display panel, the second switches are in an off state and the driver chip sends touch signals to the touch signal lines, respectively.

Other aspects or embodiments of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate embodiments of the present disclosure and, together with the description, serve to explain the principles of the present disclosure. The drawings are merely examples for illustrative purposes according to various disclosed embodiments and are not intended to limit the scope of the present disclosure.

DETAILED DESCRIPTION

Figure 1:
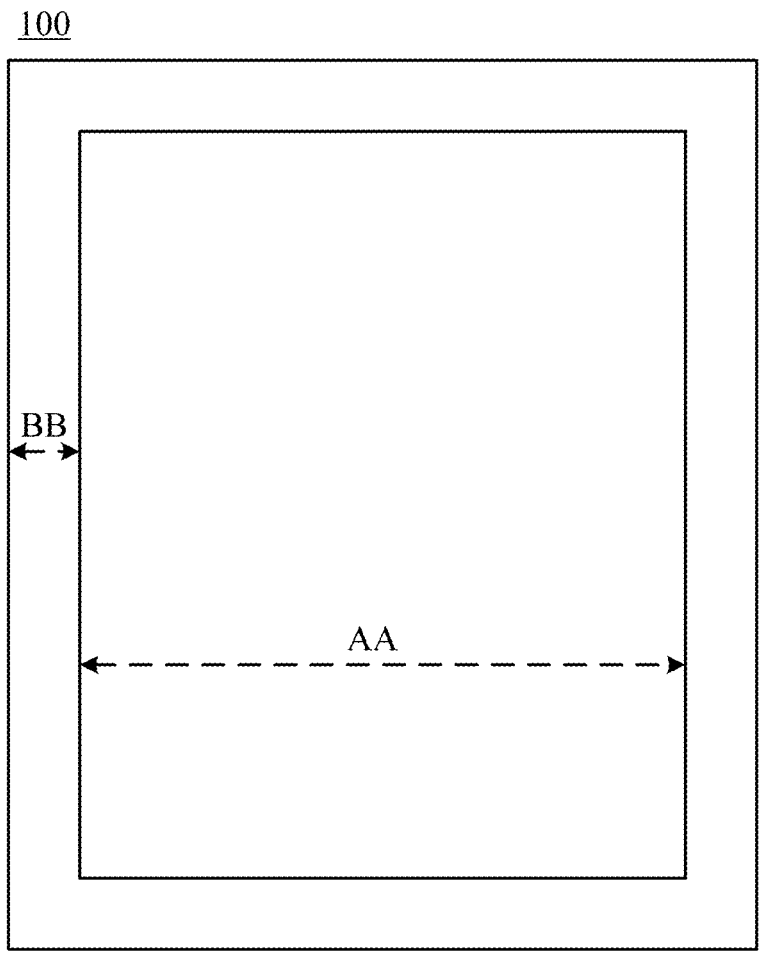
FIG. 1 illustrates a structural diagram of a display panel according to various disclosed embodiments of the present disclosure.

Reference will now be made in detail to exemplary embodiments of the disclosure, which are illustrated in the accompanying drawings. Unless otherwise specifically stated, the relative arrangement of components and steps, numerical expressions, and numerical values set forth in these embodiments do not limit the scope of the invention.

The following description for at least one exemplary embodiment is merely illustrative in nature and in no way intended to limit the invention, its application, or uses.

Techniques, methods, and devices known to those of ordinary skill in the relevant art may not be discussed in detail, but where appropriate, such techniques, methods, and devices should be considered part of the specification.

In all examples shown and discussed herein, any specific values are to be construed as illustrative only and not as limiting. Accordingly, other examples of the exemplary embodiments may have different values.

It should be noted that directional words appearing in the present disclosure are based on the relative positional relationships shown in the drawings and cannot be used as absolute limitations on the present disclosure.

Structures and implementation methods provided by embodiments of the present disclosure may be combined with each other when there is no conflict or contradiction.

Any product implementing the present disclosure does not necessarily need to achieve all the disclosed technical effects at the same time.

Notably, similar reference numerals and letters indicate similar items in the following figures. Therefore, once an item is defined in one figure, it does not require further discussion in the following figures.

The present disclosure provides a display panel, its control method, and a display device. It achieves the purpose of narrow bezel design.

In a first aspect, a display panel is provided. The display panel includes an array MUX test circuit, a driver chip, data signal lines, and touch signal lines. The array MUX test circuit includes first solder pads, second solder pads, first switches, and N clock signal input terminals, wherein N≥2, and N is a positive integer.

N first solder pads, N first switches, and one of the second solder pads form a target unit. In the target unit, the N first solder pads are electrically connected to first terminals of the N first switches in a one-to-one correspondence. Second terminals of the N first switches are each electrically connected to the one of the second solder pads. Control terminals of the N first switches are electrically connected to the N clock signal input terminals in a one-to-one correspondence. One end of the data signal line is electrically connected to one of the first solder pads, and the other end of the data signal line extends to the display area of the display panel.

The display panel further includes second switches. In the target unit, there is at least one connection path between one of the first solder pads and one of the first switches and the at least one connection path is connected to one of the second switches in series. One end of the touch signal line is electrically connected to the first terminal of a first switch in a target connection path. The target connection path is a connection path that includes a second switch connected in series and there is at least one target connection path in the target unit. The other end of the touch signal line extends toward the display area of the display panel and is electrically connected to a touch electrode block. The driver chip is electrically connected to the array MUX test circuit through a second solder pad. In a touch driving mode of the display panel, the second switches are in an off state, and the driver chip sends touch signals to the touch signal lines, respectively.

In a second aspect, the present disclosure provides a control method for a display panel. Based on the above-illustrated display panel, the control method of the display panel includes in a touch driving mode of the display panel, controlling the second switches to be in an off state; and controlling the driver chip to send touch signals to the touch signal lines, respectively.

In a third aspect, the present disclosure provides a display device. The display device includes the above-illustrated display panel.

With the above technical solutions, the present disclosure provides a display panel, its control method, and a display device. The method reuses conventional array MUX test circuits of display panels and improves the array MUX test circuits. The method connects a second switch in series in at least one connection path between a first solder pad and a first switch in a target unit, and then electrically connects an end of a touch signal line with a first terminal of a first switch in a connection path where a second switch is connected in series. When the display panel performs touch functions, the method controls second switches to be in an off state and short-circuits data signal lines. Further, based on the array MUX test circuit, the driver chip sends touch signals to touch signal lines to implement touch functions. The present disclosure is conducive to the narrow bezel design of display panel without adding new MUX circuits.

Figure 2:
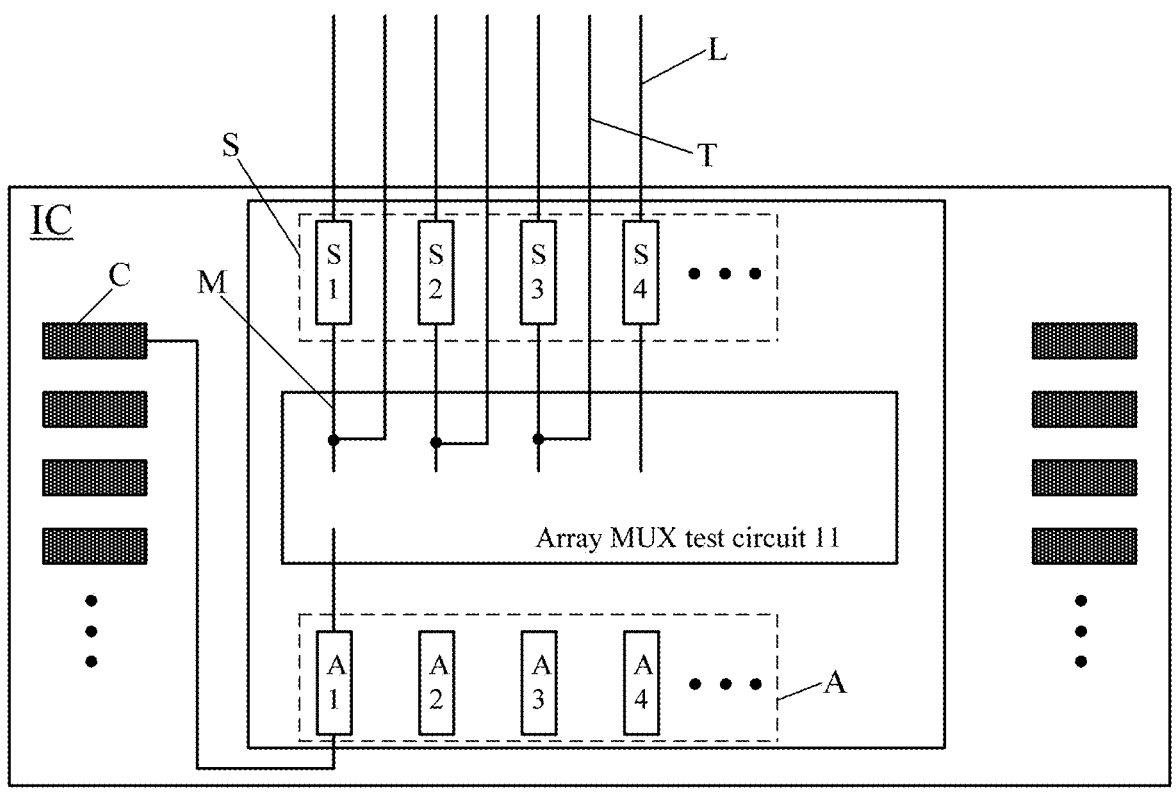
FIG. 2 illustrates a structural diagram of a fanout area of a display panel according to various disclosed embodiments of the present disclosure.
Figure 3:
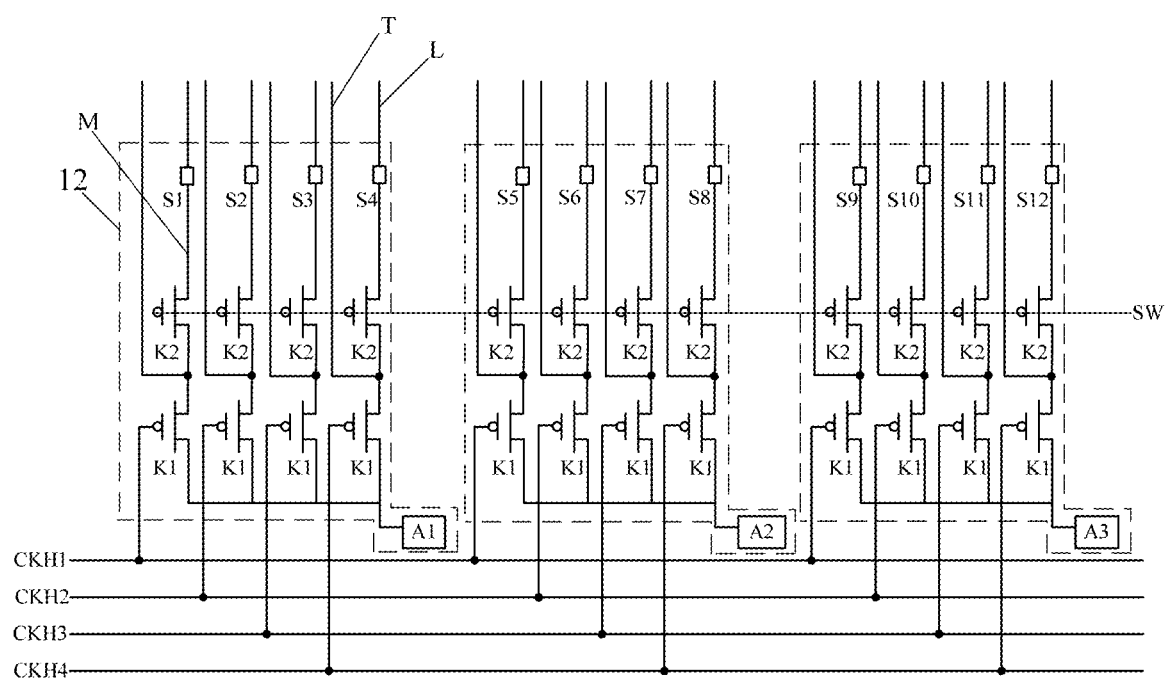
FIG. 3 illustrates a structural diagram of an array MUX test circuit according to various disclosed embodiments of the present disclosure.

FIG. 1 illustrates a schematic structural diagram of a display panel 100 provided by embodiments of the present disclosure. FIG. 2 is a schematic structural diagram of a fanout area of the display panel 100 provided by embodiments of the present disclosure. FIG. 3 is a schematic structural diagram of an array MUX test circuit provided by embodiments of the present disclosure. The display panel 100 includes a display area AA and a bezel area BB that at least partially surrounds the display area AA. In some embodiments, e.g., in some cases described below, the bezel area BB may surround the display area AA completely. The lower portion of the bezel area BB includes a fanout area. The fanout area is also known as a step area in the field.

As shown in FIG. 2, the display panel 100 further includes an array MUX test circuit 11, a driver chip IC, data signal lines L, and touch signal lines T. The array MUX test circuit 11 and driver chip IC are arranged in the fanout area.

In some embodiments, e.g., in some cases illustrated below, the driver chip IC integrates touch and display functions exemplarily. As used herein, the term "MUX" indicates multiplexer.

The array MUX test circuit 11 includes first solder pads S, second solder pads A, first switches K1, and N clock signal input terminals, wherein N≥2, and N is a positive integer. As shown in FIG. 3, when N=4 exemplarily, there are clock signal input terminals CKH1, CKH2, CKH3, CKH4.

As shown in FIG. 2, there are exemplarily four first solder pads S, i.e., S1, S2, S3, and S4 and four second solder pads A, i.e., A1, A2, A3, and A4.

N first solder pads S, N first switches K1, and a second solder pad A form a target unit 12. As shown in FIG. 3, when N=4 exemplarily, the target unit 12 includes four first solder pads S, four first switches K1, and one second solder pad A.

In the target unit 12, the N first solder pads S are electrically connected to first terminals of the N first switches K1 in a one-to-one correspondence, and second terminals of the N first switches K1 are each electrically connected to the second solder pad A. Control terminals of the N first switches K1 are electrically connected to the N clock signal input terminals in a one-to-one correspondence.

As shown in FIGS. 2 and 3, one end of the data signal line L is electrically connected to the first solder pad S, and the other end of the data signal line L extends to the display area AA of the display panel 100.

As shown in FIG. 3, the display panel 100 further includes second switches K2. In the target unit 12, there is at least one connection path between a first solder pad S and a first switch K1 that contains a second switch K2 connected in series. One end of the touch signal line T is electrically connected to a first terminal of a first switch K1 in a target connection path. In the target unit 12, a target connection path is a connection path that contains a second switch K2 connected in series and there is at least one target connection path in the target unit.

As shown in FIGS. 2 and 3, the other end of the touch signal line T extends toward the display area AA of the display panel 100 and is electrically connected to a touch electrode block. Notably in some embodiments of the present disclosure, the touch electrode block is not illustrated. In addition, a touch electrode block corresponds to a touch signal line T.

Referring to FIG. 2, the driver chip IC is electrically connected to the array MUX test circuit 11 through a second solder pad A. In a touch driving mode of the display panel 100, the second switches K2 are in an off state, and the driving chip IC sends touch signals to the touch signal lines T, respectively. As shown in FIG. 2, a second solder pad A is connected to a solder pad C on the driver chip IC to realize the electrical connection between the driver chip IC and the array MUX test circuit 11.

In some embodiments, the first switches K1 and second switches K2 are all PMOS transistors. In the touch driving mode of the display panel 100 of such cases, the control signal SW is a high-level signal and controls the second switches K2 to be in an off state. At this time, the data signal line L is short-circuited, causing the driver chip IC to send a touch signal to a touch signal line T.

Optionally, clock signals received by the N clock signal input terminals are high-level signals or low-level signals with different timings to control the conduction state of the first switches K1 at different connection links.

As shown in FIG. 3, in the target unit 12, a second switch K2 is connected in series in each connection path between a first solder pad S and a first switch K1. Each of the target connection paths connects with one of the touch signal lines T correspondingly.

In some embodiments, when the display panel 100 contains self-capacitive touch functions, a touch signal line T corresponding to a touch electrode block of the display panel 100 may be understood as a self-capacitance touch panel (TP) signal channel. For large-size display panels with many self-capacitance TP signal channels, the driver chip IC may not have space to add a lot of solder pads C to connect with the touch signal lines T. As such, in the existing technologies, large-size display panels with self-capacitive touch functions may adopt the design of MUX circuits to realize touch functions. Although the number of solder pads C in the driver chip IC may be reduced to a certain extent, the newly designed MUX circuits occupy the bezel area BB of the display panel 100. Usually, MUX circuits are arranged in the fanout area. As such, it occupies a certain space in the fanout area, seriously affecting the narrow bezel design of the display panel 100.

During a fabrication process of an array substrate of the display panel 100, the array MUX test circuit 11 in the fanout area is also made. At the same time, the data signal lines L are also formed. The data signal lines L are electrically connected to the array MUX test circuit 11. Before pixels are deposited, line defect detection may be carried out based on the array MUX test circuit 11. At this time, the driver chip IC is not set up yet, and the touch signal lines T are also not made.

After the detection is completed, the array MUX test circuit 11 will no longer be used. Further, processes such as driver chip IC binding, pixel deposition, thin film encapsulation (TFE), and TP process are carried out. The array substrate is also known as a thin film transistor (TFT) substrate in the field. Touch components such as touch signal lines T may be formed during the TP process.

Since the TP process follows the TFE packaging process, conventional array MUX test circuits of the display panel 100 are reused. Further, array MUX test circuits are improved during the preparation process of array MUX test circuit. For example in the target unit 12, a second switch K2 is connected in series in at least one connection path between a first solder pad S and a first switch K1. The array MUX test circuit 11 is formed. Further, in the TP process, one end of a touch signal line T is electrically connected to the first terminal of a first switch K1 and the first switch K1 is arranged in a connection path in which a second switch K2 is connected in series. When the display panel 100 implements touch functions, the second switches K2 are controlled to be in an off state. The data signal lines L are short-circuited. Then the driver chip IC sends touch signals to the touch signal lines T based on the array MUX test circuit 11, which causes implementation of touch functions. Because in the touch driving mode of the display panel 100, the data signal lines L connected to the array MUX test circuit 11 are short-circuited by the second switches K2, the design does not affect the normal display of the display panel 100.

It is seen from the above descriptions that the array MUX test circuit of the display panel 100 is reused and improved. Large-size display panels having self-capacitive touch functions may realize touch functions. It is conducive to the narrow bezel design of the display panel 100 without adding any new MUX circuit.

In a test phase for line defects, the touch signal lines T are not electrically connected to the array MUX test circuit 11 yet. Compared with a conventional array MUX test circuit, the improved array MUX test circuit 11 only has one different feature, i.e., control of the second switch K2. If the second switch K2 is in a conductive state during the test phase for line defects, normal tests of line defects may be performed.

Figure 4:
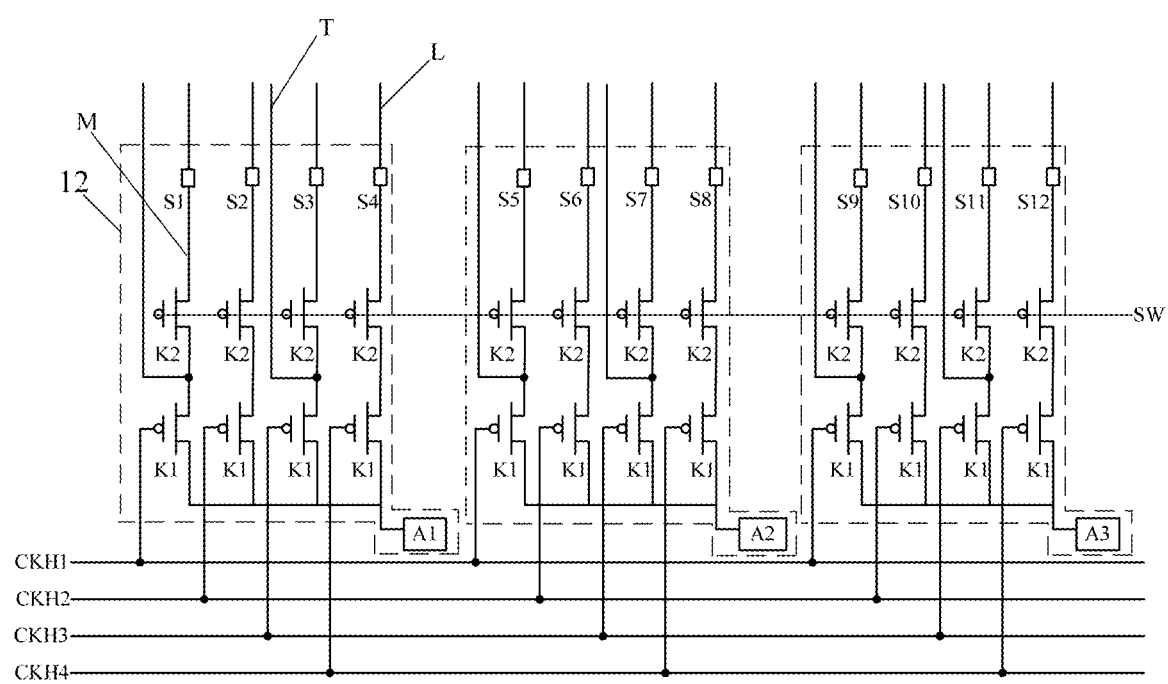
FIG. 4 illustrates a structural diagram of another array MUX test circuit according to various disclosed embodiments of the present disclosure.
Figure 5:
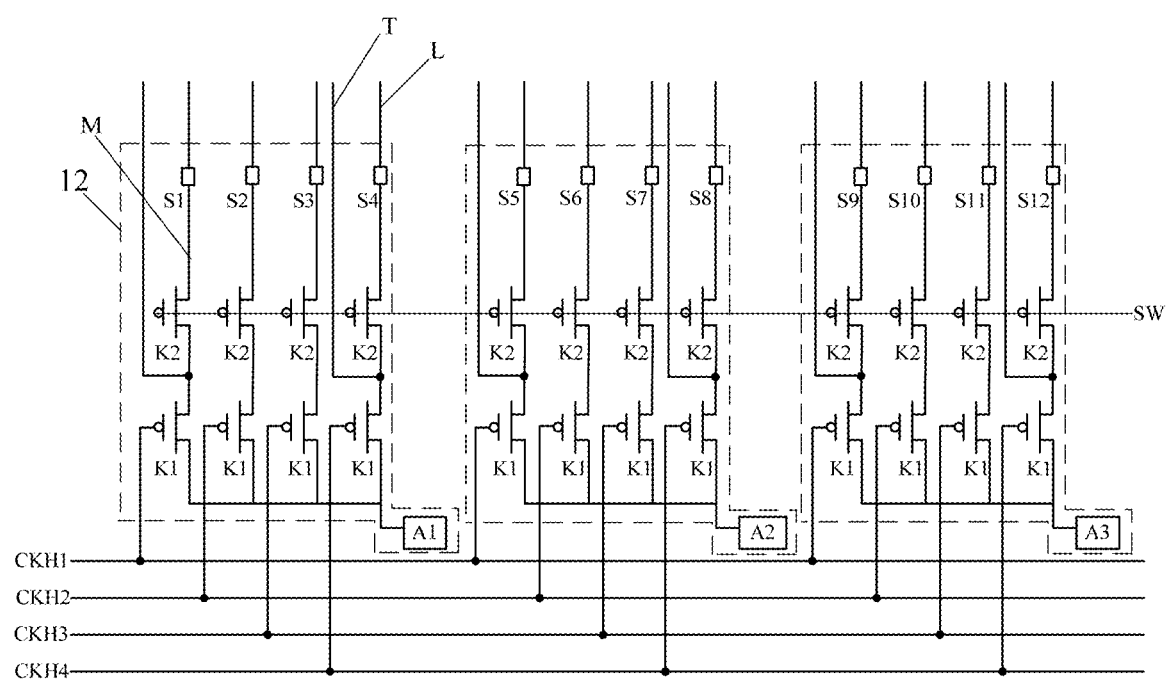
FIG. 5 illustrates a structural diagram of another array MUX test circuit according to various disclosed embodiments of the present disclosure.

FIG. 4 is a schematic structural diagram of another array MUX test circuit provided by embodiments of the present disclosure. FIG. 5 is a schematic structural diagram of yet another array MUX test circuit provided by embodiments of the present disclosure. Optionally in the target unit 12, there is at least one target connection path that is not connected to any touch signal line T between two target connection paths that are connected to a touch signal line T.

As shown exemplarily in the target unit 12, target connection paths that are connected to a touch signal line T are separated by one target connection path that is not connected to any touch signal line T in FIG. 4, while target connection paths that are connected to a touch signal line T are separated by two target connection paths that are not connected to any touch signal line T in FIG. 5.

Since the number of data signal lines L in the display panel 100 is much greater than the number of touch signal lines T, connection methods between the touch signal lines T and the array MUX test circuit 11 are diverse. As illustrated above, in the target unit 12, target connection paths that are connected to a touch signal line T are separated by at least one target connection path that is not connected to any touch signal line T. As such, it may ensure that the distance between two adjacent touch signal lines T is relatively long. It reduces signal interference from adjacent touch signal lines T and improves the signal quality of signals transmitted by each touch signal line T.

Figure 6:
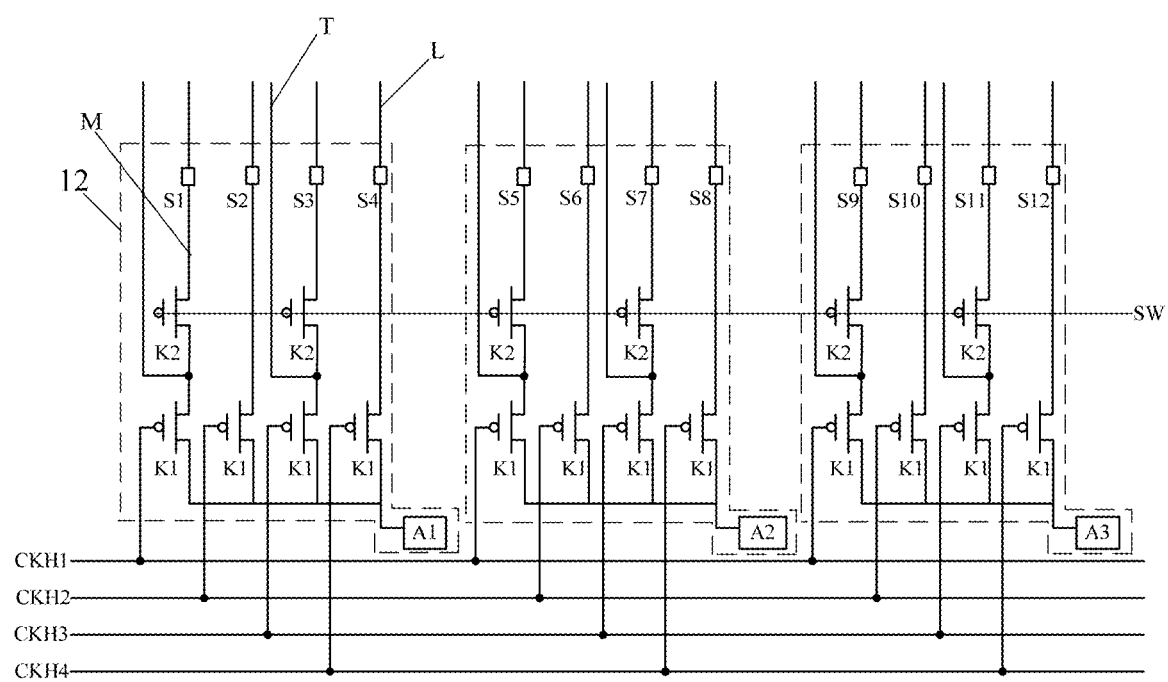
FIG. 6 illustrates a structural diagram of another array MUX test circuit according to various disclosed embodiments of the present disclosure.
Figure 7:
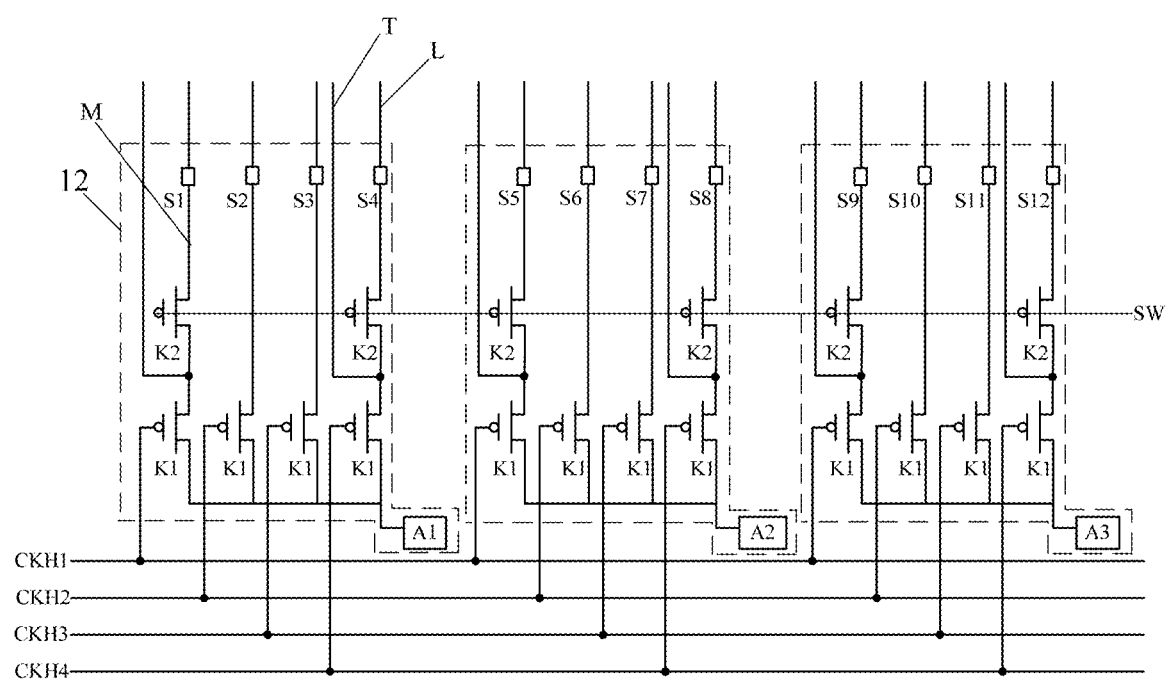
FIG. 7 illustrates a structural diagram of another array MUX test circuit according to various disclosed embodiments of the present disclosure.

FIG. 6 is a schematic structural diagram of another array MUX test circuit provided by embodiments of the present disclosure. FIG. 7 is a schematic structural diagram of yet another array MUX test circuit provided by embodiments of the present disclosure. Optionally in the target unit 12, two target connection paths containing a second switch K connected in series are separated by at least one target connection path that does not contain any second switch K.

Since the number of data signal lines L in the display panel 100 is much greater than the number of touch signal lines T, connection methods between the touch signal lines T and the array MUX test circuit 11 are diverse. That is, not all connection paths require a second switch K2 connected in series. As shown exemplarily in the target unit 12, two connection paths containing a second switch K connected in series are separated by a connection path that does not contain any second switch K in FIG. 6, while two connection paths containing a second switch K connected in series are separated by two connection paths that do not contain any second switch K in FIG. 7. Further as shown in FIGS. 6 and 7, each of the target connection paths correspondingly connects to a touch signal line T.

When structures shown in FIGS. 4 and 6 are compared, it is seen that each target unit 12 shown in FIG. 6 may save two second switches K2. Similarly, when structures shown in FIGS. 5 and 7 are compared, it is seen that each target unit 12 shown in FIG. 7 may save two second switches K2. It achieves the purpose of simplifying circuits and reducing costs.

Figure 8:
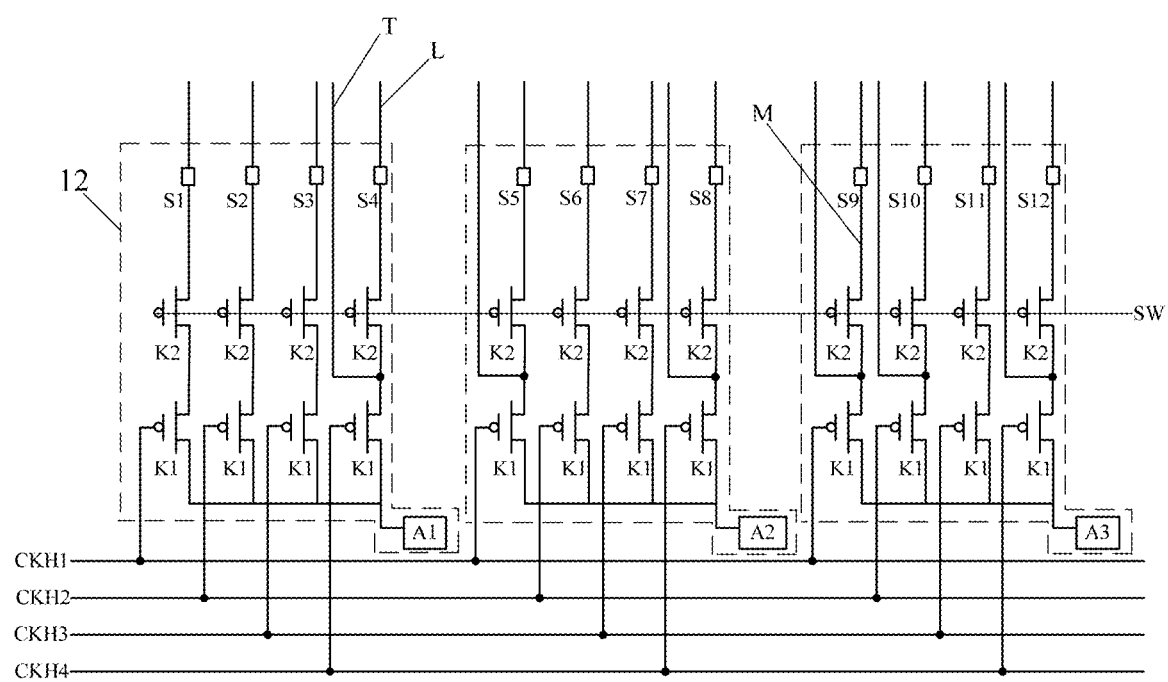
FIG. 8 illustrates a structural diagram of another array MUX test circuit according to various disclosed embodiments of the present disclosure.

FIG. 8 is a schematic structural diagram of yet another array MUX test circuit provided by embodiments of the present disclosure. The number of touch signal lines T connected to each target unit 12 is different. As shown in FIG. 8, there are a first target unit 12, a second target unit 12, and a third target unit 12 from left to right. Exemplarily, the first target unit 12 is correspondingly connected to one touch signal line T, the second target unit 12 is correspondingly connected to two touch signal lines T, and the third target unit 12 is correspondingly connected to three touch signal lines T.

As such, the connection relationship between the touch signal lines T and the array MUX test circuit 11 is diverse, and may be reasonably determined based on positions of touch electrode blocks corresponding to each touch signal line T or wiring and other factors.

As shown in FIGS. 2-8, a first solder pad S and the first terminal of a first switch K1 may be electrically connected through a first signal line M.

In some embodiments, one end of the touch signal line T is short-circuited with the first signal line M.

Optionally, the first signal line M may be disposed on a side of the array layers, and the touch signal line T may be disposed on a side of the TP layers. A touch signal line T may be short-circuited with a first signal line M through a layer via, thereby connecting the touch signal line T and the array MUX test circuit 11. As used herein, the term "layer via" indicates a via that extends and penetrates through certain layers.

Figure 9:
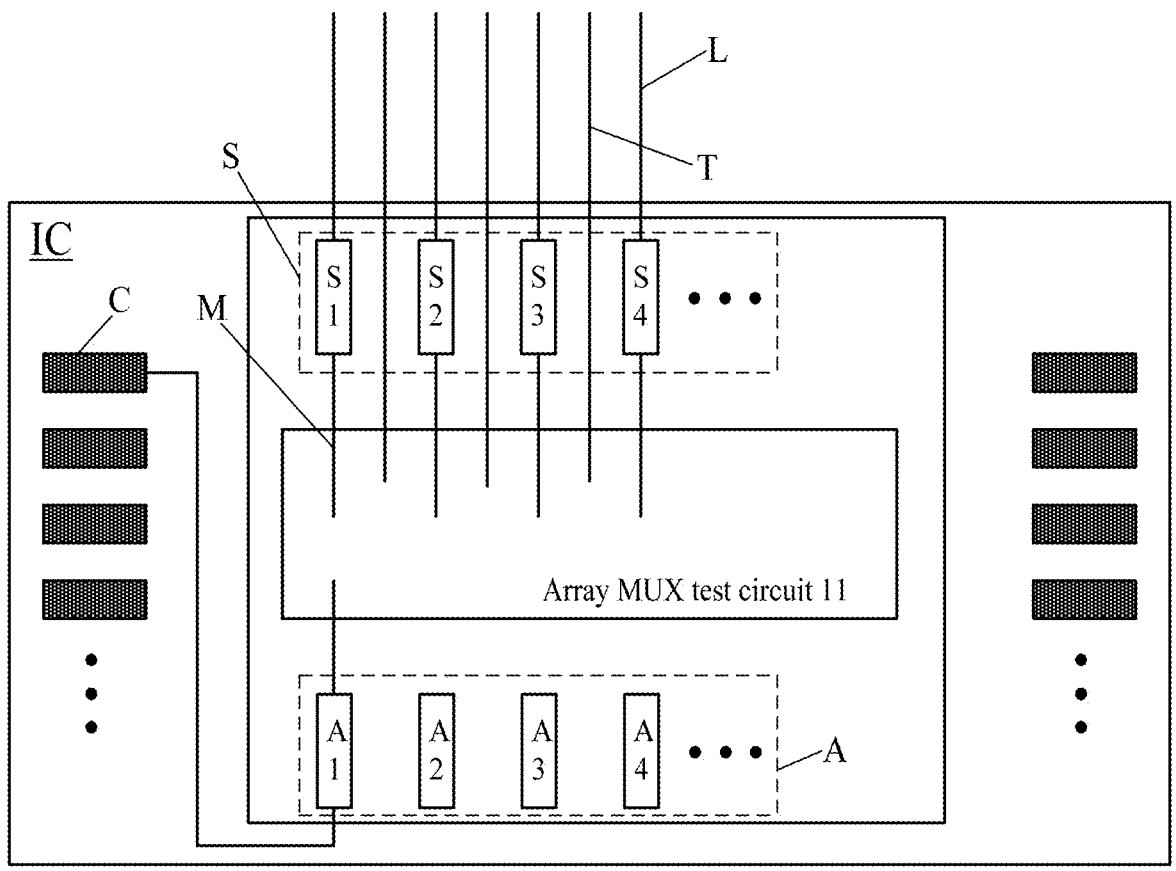
FIG. 9 illustrates a structural diagram of another fanout area of a display panel according to various disclosed embodiments of the present disclosure.

FIG. 9 is a schematic structural diagram of another fanout area of a display panel provided by embodiments of the present disclosure. The touch signal line T is located between two adjacent first solder pads S.

In some embodiments, a spacing area between two adjacent first solder pads S is utilized reasonably. The touch signal lines T may be routed through the spacing area between two adjacent first solder pads S without adding additional wiring space. In this way, the wiring method of touch signal lines T is simplified, and the connection method between the touch signal lines T and the array MUX test circuit 11 is also simplified.

Figure 10:
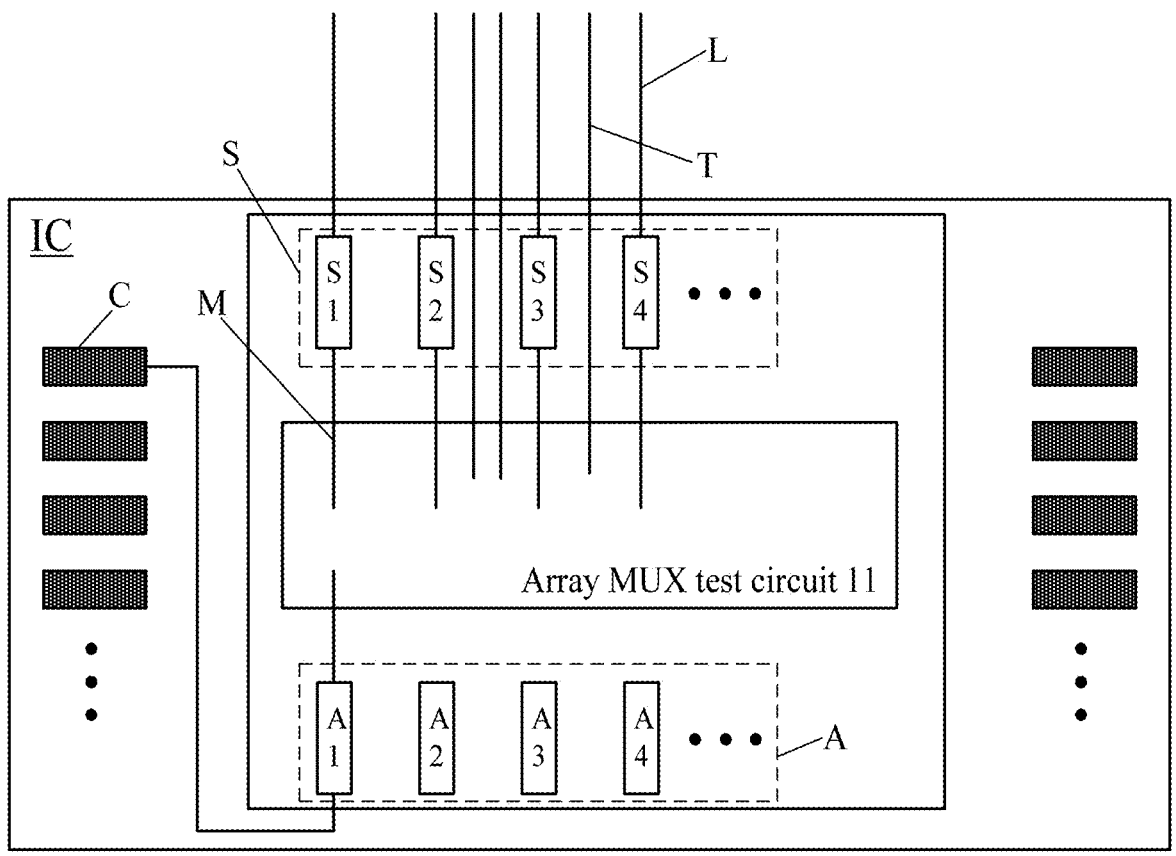
FIG. 10 illustrates a structural diagram of another fanout area of a display panel according to various disclosed embodiments of the present disclosure.
Figure 11:
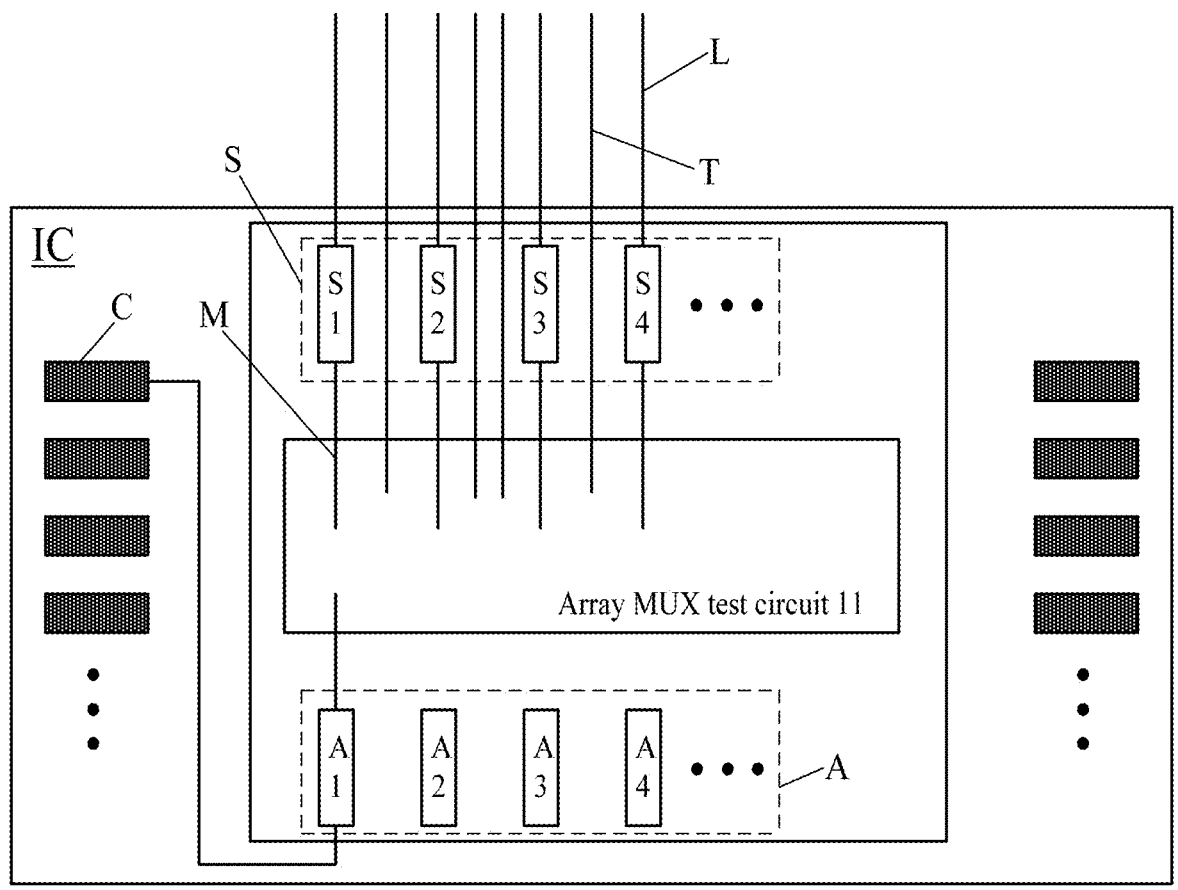
FIG. 11 illustrates a structural diagram of another fanout area of a display panel according to various disclosed embodiments of the present disclosure.

FIG. 10 is a schematic structural diagram of another fanout area of a display panel provided by embodiments of the present disclosure. FIG. 11 is a schematic structural diagram of yet another fanout area of a display panel provided by embodiments of the present disclosure. The number of the touch signal line between two adjacent ones of a portion of the first solder pads is H1, and the number of the touch signal line between two adjacent ones of another portion of the first solder pads is H2, wherein H1≠H2.

Optionally as shown in FIG. 10, there is no touch signal line T between the first solder pads S1 and S2. There are two touch signal lines T between the first solder pads S2 and S3. There is one touch signal line T between the first solder pads S3 and S4. In some other cases as shown in FIG. 11, there is one touch signal line T between the first solder pads S1 and S2, there are two touch signal lines T between the first solder pads S2 and S3, and there is one touch signal line T between the first solder pads S3 and S4.

As there may be other signal lines in a spacing area between two adjacent first solder pads S, the number of touch signal lines T between the two adjacent first solder pads S may be reasonably set based on the number of other signal lines existing in the spacing area. In this way, the wiring method of touch signal lines T may be simplified, and signal interference between touch signal lines T and other signal lines may be reduced.

As shown in FIG. 10, when the number of other signal lines between the first solder pads S1 and S2 is large, the touch signal line T does not need to be arranged between the first solder pads S1 and S2.

Figure 12:
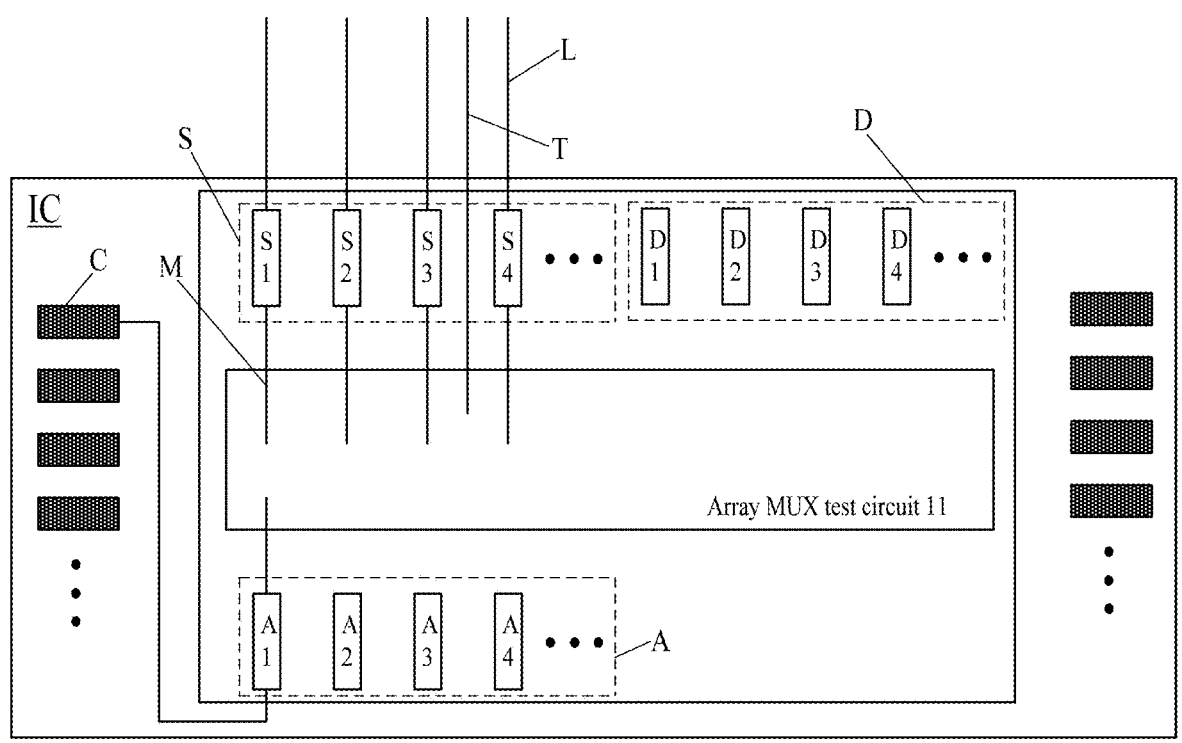
FIG. 12 illustrates a structural diagram of another fanout area of a display panel according to various disclosed embodiments of the present disclosure.
Figure 13:
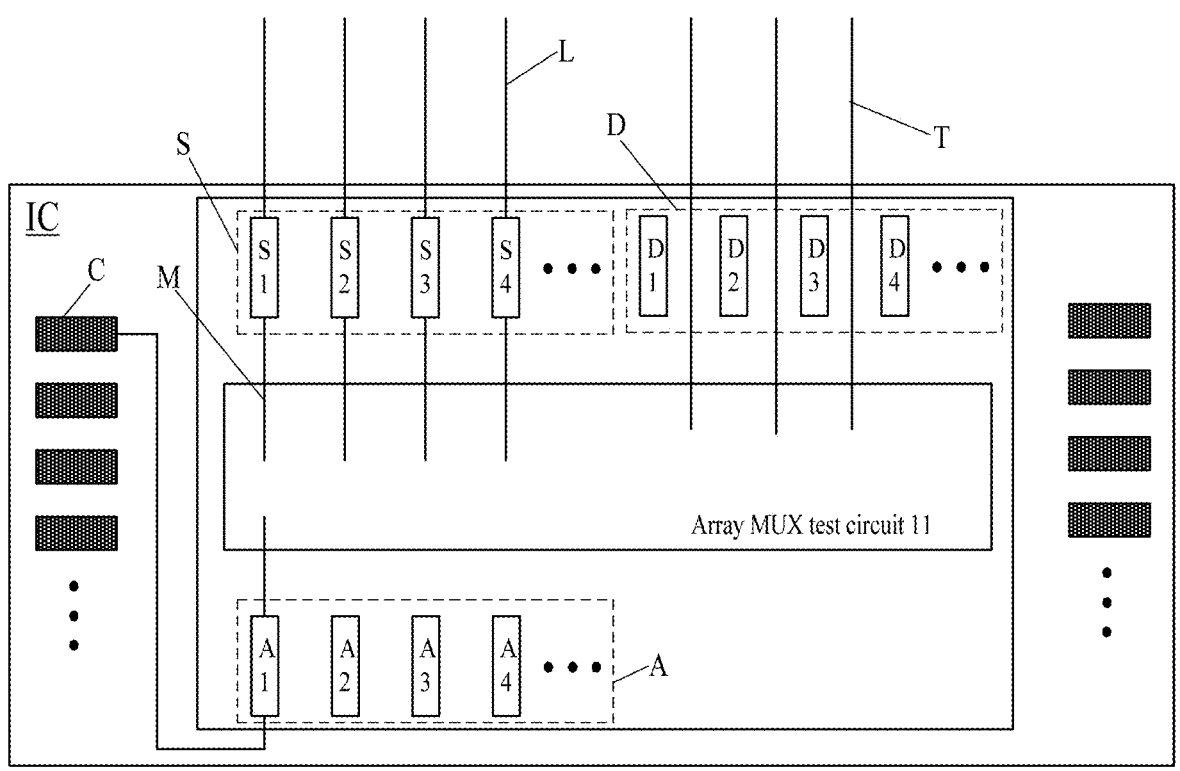
FIG. 13 illustrates a structural diagram of another fanout area of a display panel according to various disclosed embodiments of the present disclosure.

FIG. 12 is a schematic structural diagram of another fanout area of a display panel provided by embodiments of the present disclosure. FIG. 13 is a schematic structural diagram of yet another fanout area of a display panel provided by embodiments of the present disclosure. Optionally, the array MUX test circuit 11 includes third solder pads D, and the third solder pads D and the first solder pads S are arranged on the same side of the array MUX test circuit 11.

In some cases, some of the third solder pads D have no power connection.

As shown in FIG. 13, the touch signal lines T are located between two adjacent third solder pads D, respectively.

As illustrated exemplarily in FIGS. 12 and 13, the third solder pads D include D1, D2, D3, and D4 from left to right. Referring to FIG. 12, the array MUX test circuit 11 includes the third solder pads D, and a touch signal line T is configured between two adjacent first solder pads S. Referring to FIG. 13, the array MUX test circuit 11 includes the third solder pads D, and the touch signal lines T are configured between two adjacent third solder pads D, respectively.

After the array MUX test circuit 11 is electrically connected to the data signal lines L, a portion of the third pads D that are not connected to the data signal lines L may remain. Optionally, there may be no wiring of the data signal lines L in an area where the third solder pads D are located. In some embodiment, the touch signal lines T are disposed between two adjacent third solder pads D, respectively. It achieves the purpose of staying away from the data signal lines L, and reduces signal interference problems between the data signal line L and the touch signal line D. Moreover, it simplifies wiring methods of the touch signal lines T, and simplifies connection methods between the touch signal lines T and the array MUX test circuit 11.

Figure 14:
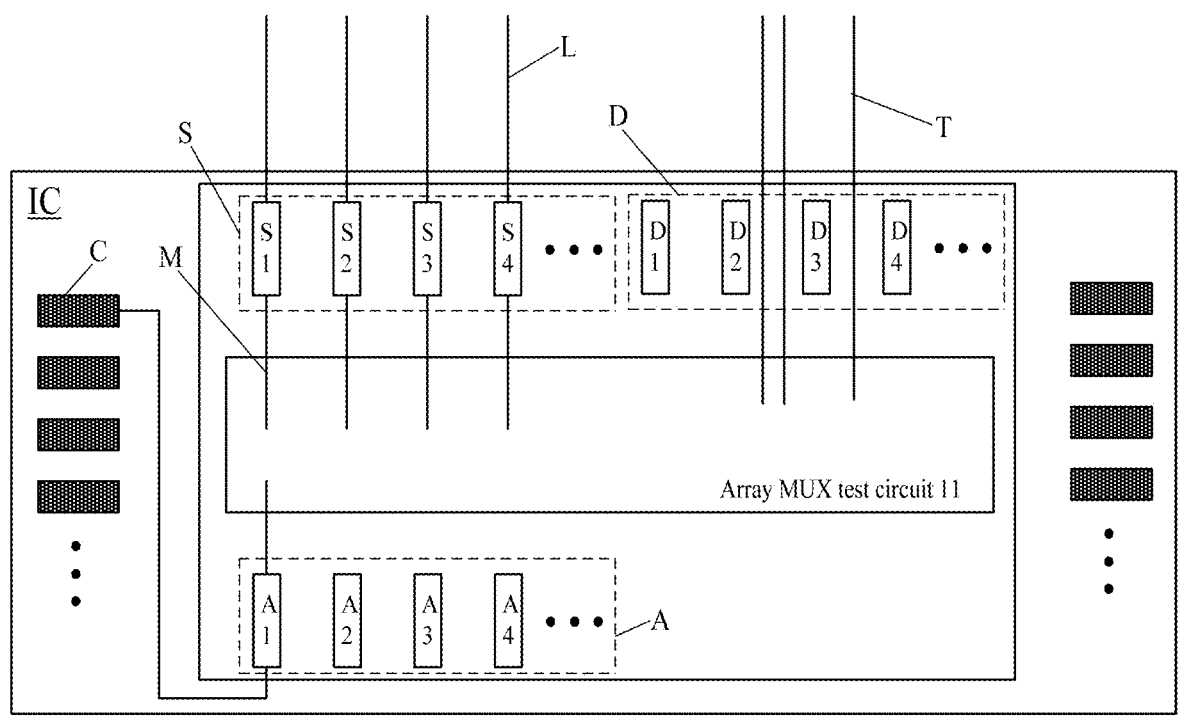
FIG. 14 illustrates a structural diagram of another fanout area of a display panel according to various disclosed embodiments of the present disclosure.
Figure 15:
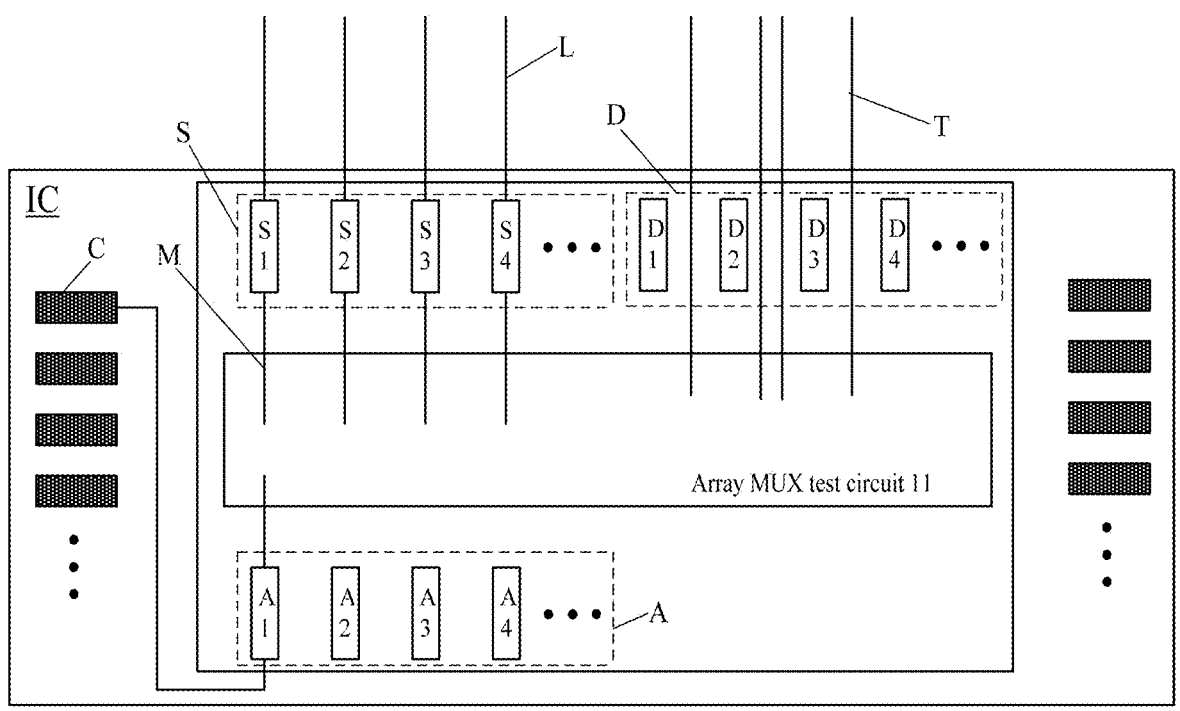
FIG. 15 illustrates a structural diagram of another fanout area of a display panel according to various disclosed embodiments of the present disclosure.

FIG. 14 is a schematic structural diagram of another fanout area of a display panel provided by embodiments of the present disclosure. FIG. 15 is a schematic structural diagram of yet another fanout area of a display panel provided by embodiments of the present disclosure. Optionally, the number of a portion of the touch signal lines between of two adjacent third solder pads D is Y1, and the number of another portion of the touch signal lines between two adjacent third solder pads D is Y2, wherein Y1/Y2.

Optionally as shown in FIG. 14, there is no touch signal line T between the third solder pads D1 and D2. There are two touch signal lines T between the third solder pads D2 and D3. There is one touch signal line T between the third solder pads D3 and D4. In some other cases as shown in FIG. 15, there is one touch signal line T between the third solder pads D1 and D2, there are two touch signal lines T between the third solder pads D2 and D3, and there is one touch signal line T between the third solder pads D3 and D4.

As there may be other signal lines in a spacing area between two adjacent third solder pads D, the number of touch signal lines T between the two adjacent third solder pads D may be reasonably arranged based on the number of other signal lines existing in the spacing area. As such, the wiring method of the touch signal lines T may be simplified, and signal interference between touch signal lines T and other signal lines may be reduced.

As shown in FIG. 14, when the number of other signal lines between the third solder pads D1 and D2 is large, the touch signal line T does not need to be disposed between the third solder pads D1 and D2.

Figure 16:
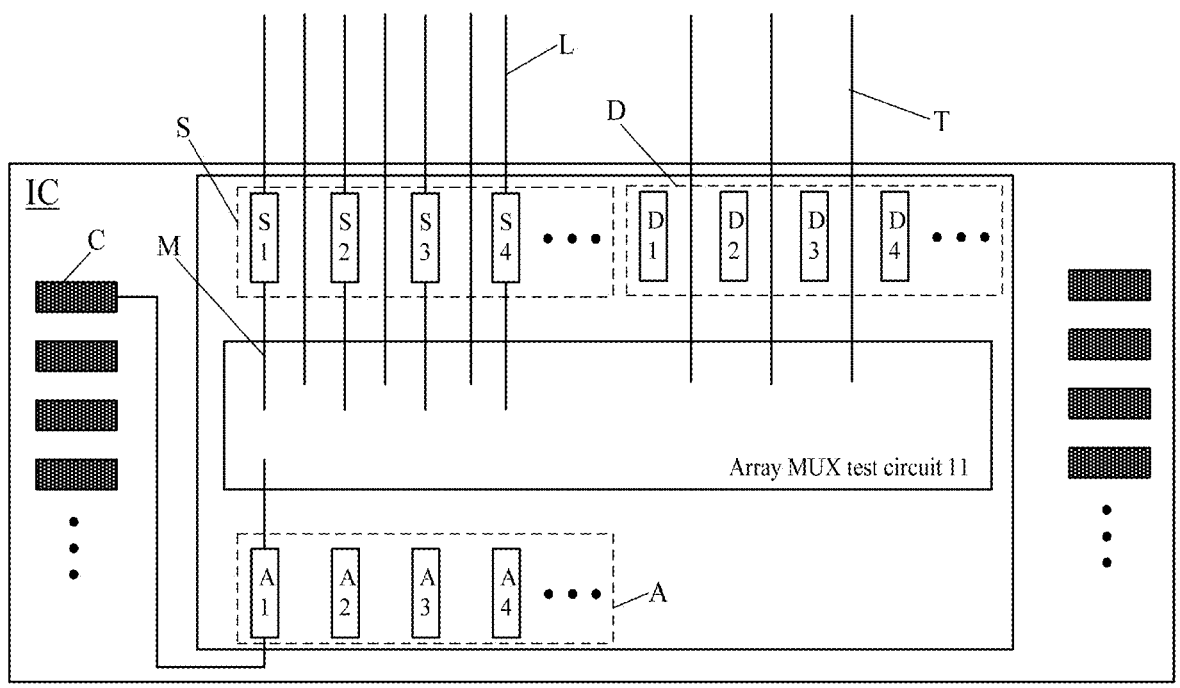
FIG. 16 illustrates a structural diagram of another fanout area of a display panel according to various disclosed embodiments of the present disclosure.

FIG. 16 is a schematic structural diagram of another fanout area of a display panel provided by embodiments of the present disclosure. Some touch signal lines are arranged between of two adjacent first solder pads S, and some touch signal lines are arranged between of two adjacent third solder pads D.

In some embodiments, if all the touch signal lines T are arranged between two adjacent first solder pads S, that is, when the touch signal lines T are disposed in an area where the first solder pads S are located, it may increase the difficulty of wiring the touch signal lines T and touch electrode blocks in the right display area AA. If all the touch signal lines T are arranged between two adjacent third solder pads D, that is, when the touch signal lines T are disposed in an area where the third solder pads D are located, it may increase the difficulty of wiring the touch signal lines T and touch electrode blocks in the left display area AA.

Thus in some embodiments, when a part (e.g., one or more) of the touch signal lines are arranged between of two adjacent first solder pads S, and another part of the touch signal lines are arranged between of two adjacent third solder pads D, the wiring difficulty between the touch signal lines T and all touch electrode blocks is reduced. For example, touch signal lines T in an area where the first solder pads S are located are connected to touch electrode blocks in the left display area AA. Touch signal lines T in an area where the third solder pads D are located are connected to touch electrode blocks in the right display area AA. Touch signal lines T in the middle part are connected to touch electrode blocks in the middle display area AA. The wiring difficulty of the touch signal lines T and the touch electrode blocks is greatly reduced.

Figure 17:
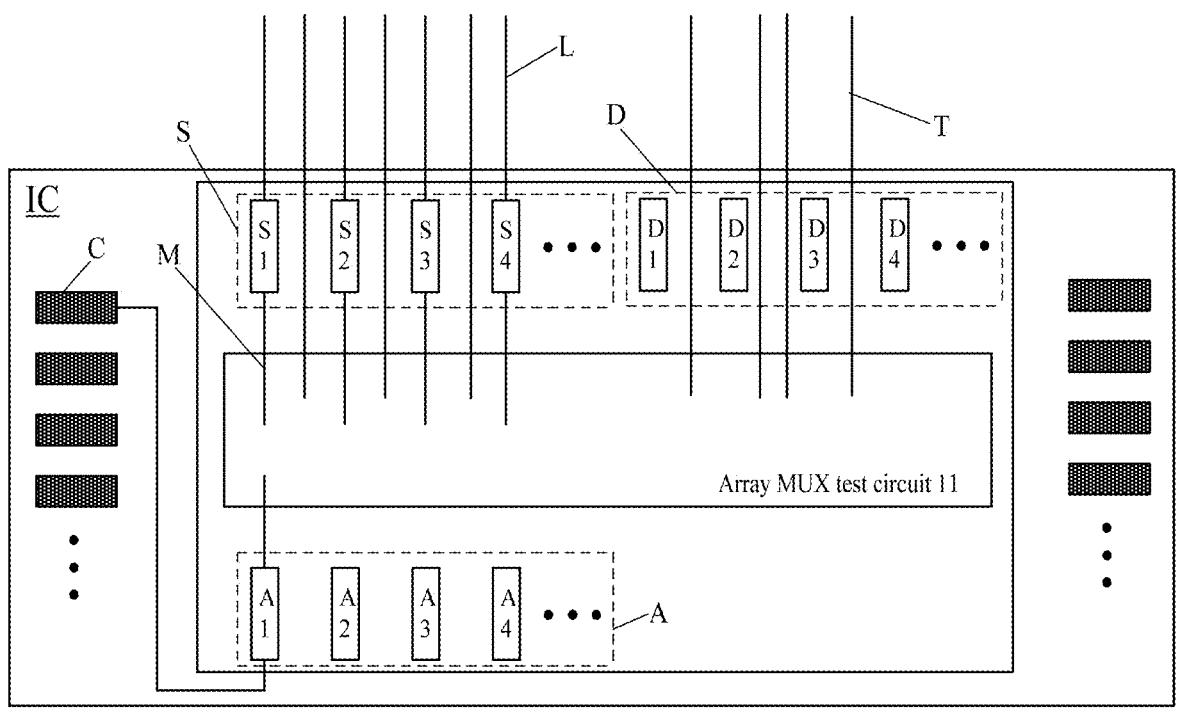
FIG. 17 illustrates a structural diagram of another fanout area of a display panel according to various disclosed embodiments of the present disclosure.

FIG. 17 is a schematic structural diagram of another fanout area of a display panel provided by embodiments of the present disclosure. The number of touch signal lines between of two adjacent first solder pads S is W1, and the number of touch signal lines between two adjacent third solder pads D is W2, wherein W1/W2.

As shown in FIG. 17, in some cases, there is a touch signal line T between the first solder pads S1 and S2, there is a touch signal line T between the first solder pads S2 and S3, and there is a touch signal line T between the first solder pads S3 and S4. In addition, there is a touch signal line T between the third solder pads D1 and D2, there are two touch signal lines T between the third solder pads D2 and D3, and there is a touch signal line T between the third solder pads D3 and D4.

Thus, when the touch signal lines T are distributed in areas where the first solder pads S and the third solder pads D are located, the wiring method of the touch signal lines T may be flexibly set. There is no limit to the description in the embodiments of the present disclosure. All wiring methods are designed to simplify the difficulty of wiring.

Figure 18:
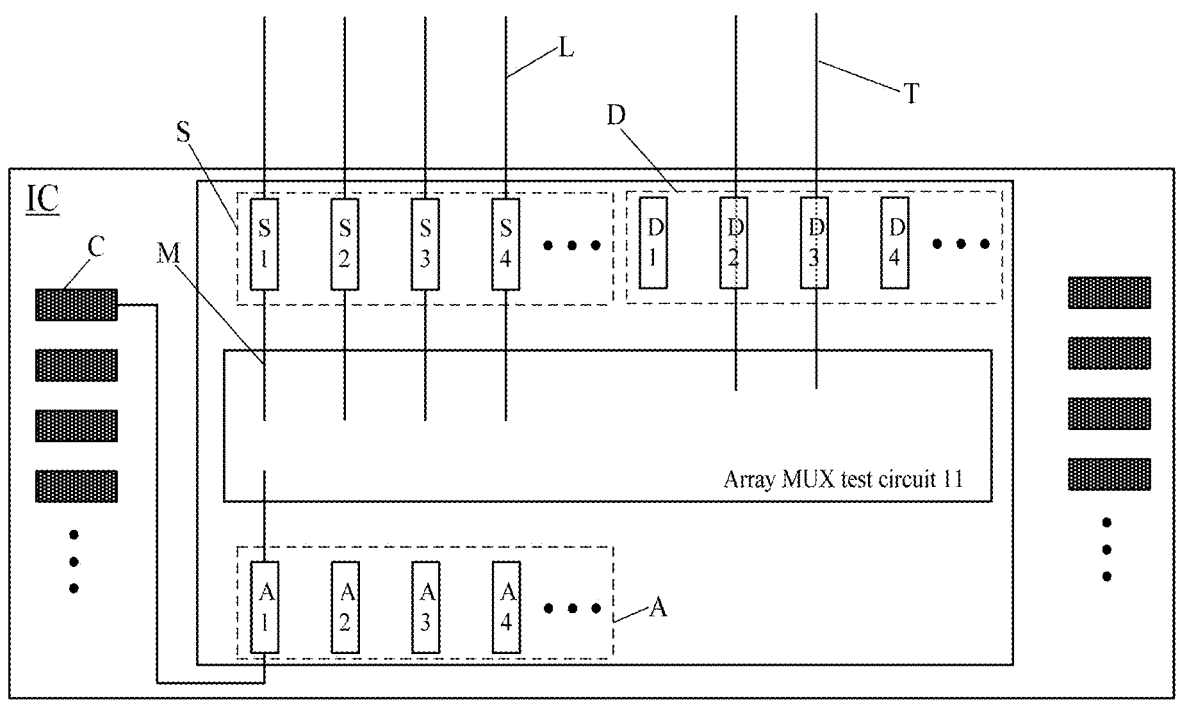
FIG. 18 illustrates a structural diagram of another fanout area of a display panel according to various disclosed embodiments of the present disclosure.
Figure 19:
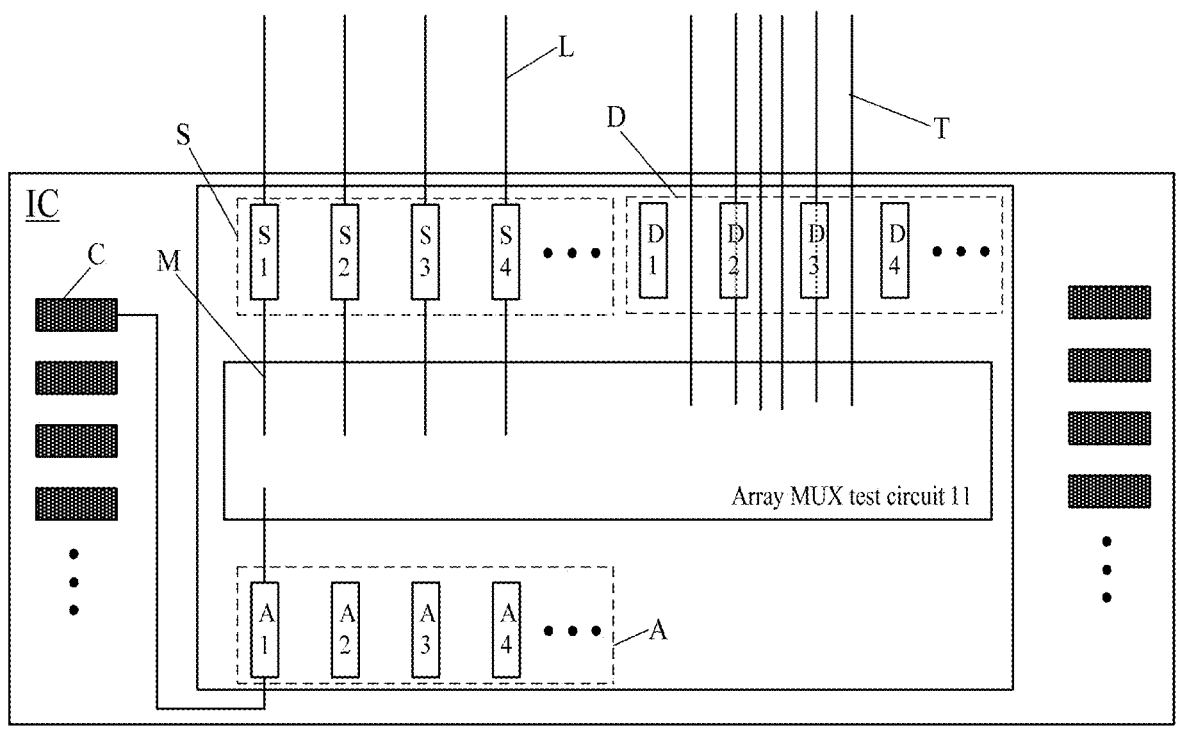
FIG. 19 illustrates a structural diagram of another fanout area of a display panel according to various disclosed embodiments of the present disclosure.

FIG. 18 is a schematic structural diagram of another fanout area of a display panel provided by embodiments of the present disclosure. FIG. 19 is a schematic structural diagram of yet another fanout area of a display panel provided by embodiments of the present disclosure. The third solder pads D are formed in the first layer, the touch signal lines T are formed in the second layer, and the first layer and the second layer are different layers.

The orthographic projection of the touch signal lines T on a plane where the display panel 100 is located overlaps with the orthographic projection of the third solder pads D on the plane where the display panel 100 is located.

As shown in FIG. 18, by arranging the touch signal lines T in the bottom layer of the third solder pads D, the impact of the third solder pads D on the wiring of the touch signal lines T is reduced, and the wiring difficulty of the touch signal lines T is also reduced. Further, when the touch signal lines T are disposed in a different layer from the third solder pads D, it may increase the number of touch signal lines T in an area where the third solder pads D are located.

Further as shown in FIG. 19, in an area where the third solder pads D is located, part of the touch signal lines T are located between two adjacent third solder pads D, and part of the touch signal lines T are routed in the bottom layer of the third solder pads D. When the connection with the array MUX test circuit 11 is achieved, the number of touch signal lines T that may be arranged in the area where the third solder pads D are located is further increased.

Figure 20:
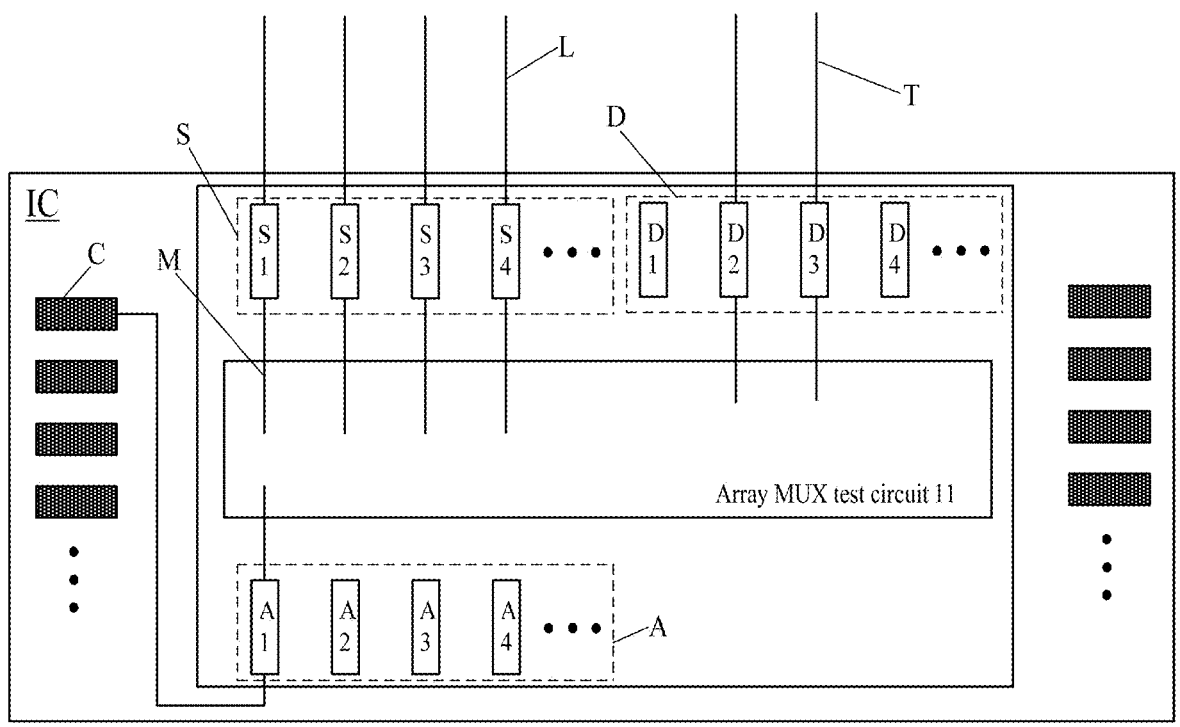
FIG. 20 illustrates a structural diagram of another fanout area of a display panel according to various disclosed embodiments of the present disclosure.

FIG. 20 is a schematic structural diagram of another fanout area of a display panel provided by embodiments of the present disclosure. Optionally, the third solder pads D are connected in series with the touch signal lines T.

In some embodiments, after the array MUX test circuit 11 is electrically connected with the data signal lines L, part of the third solder pads D that are not connected to the data signal lines L may remain. At this time, there is no wiring of the data signal lines L in an area where the third solder pads D are located. Thus, in some cases, the third solder pads D may be connected in series with the touch signal lines T, which is equivalent to utilizing the third solder pads D so that the third solder pads D serve as a part of the touch signal lines T and also have functions of signal transmission. Moreover, the wiring method of the touch signal lines T may be further simplified, and the connection method between the touch signal lines T and the array MUX test circuit 11 may also be simplified.

Figure 21:
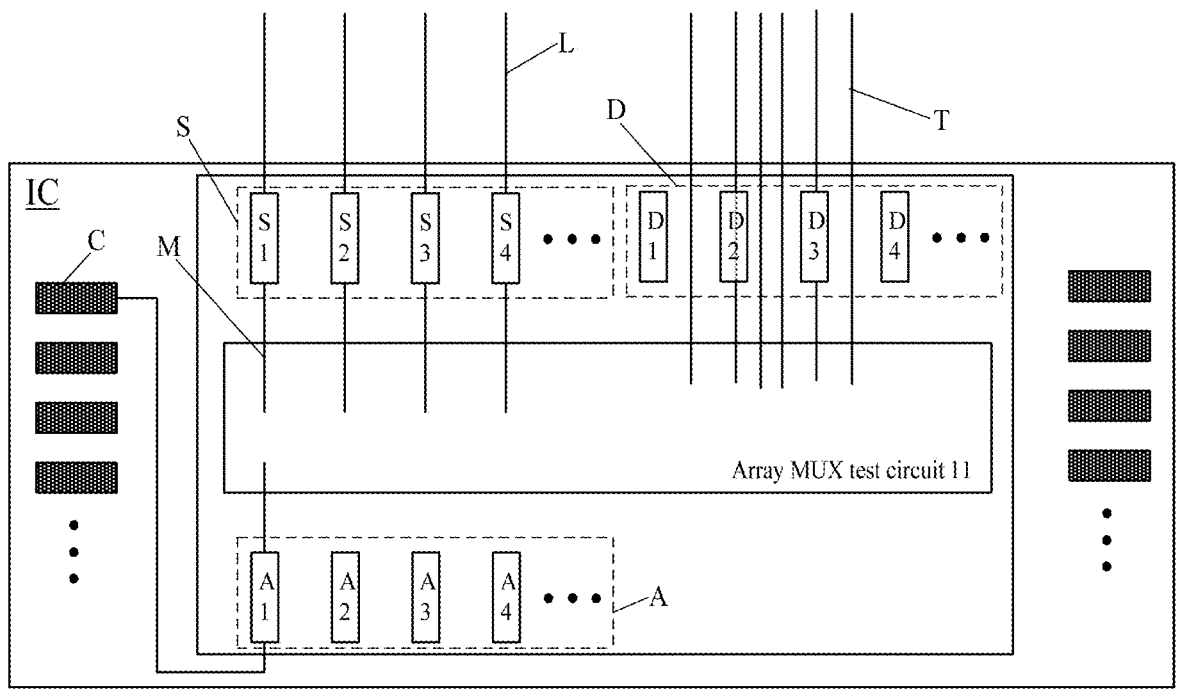
FIG. 21 illustrates a structural diagram of another fanout area of a display panel according to various disclosed embodiments of the present disclosure.

FIG. 21 is a schematic structural diagram of another fanout area of a display panel provided by embodiments of the present disclosure. In some embodiments, in an area where the third solder pads D are located, a part (e.g., one or more) of the touch signal lines T are arranged between two adjacent third solder pads D, another part of the touch signal lines T are routed in the bottom layer of the third solder pads D, and another part of the third solder pads D are connected in series to the touch signal lines T. As such, in the area where the third solder pads D are located, while connections with the array MUX test circuit 11 are made, the number of touch signal lines T that may be arranged is further increased.

Obviously, there are some other alternative schemes regarding positions where the touch signal lines T may be disposed, which will not be listed here.

Figure 22:
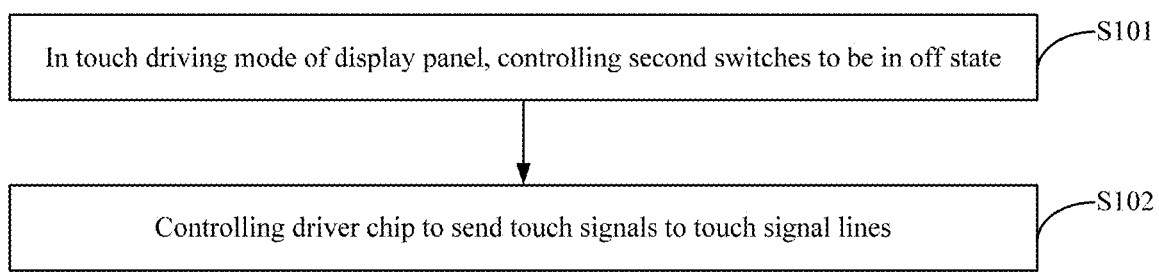
FIG. 22 illustrates a flow chart of a control method for a display panel according to various disclosed embodiments of the present disclosure.

FIG. 22 illustrates a flow chart of a control method for a display panel according to embodiments of the present disclosure. The control method of the display panel is based on the display panel 100 described in the above embodiments. The control method of the display panel includes:

At S101, in a touch driving mode of display panel, the second switches K2 are controlled to be in an off state.

At S102, the driver chip IC is controlled to send touch signals to the touch signal lines T, respectively.

Figure 23:
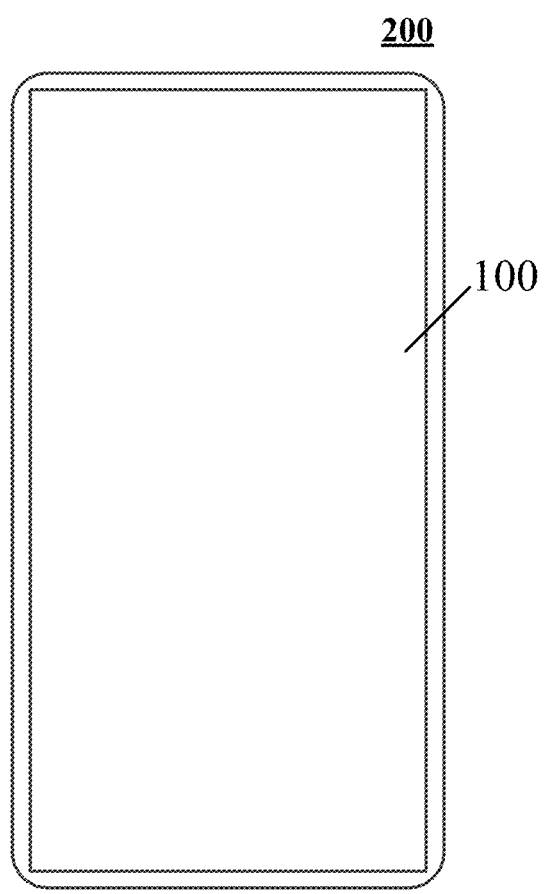
FIG. 23 illustrates a structural diagram of a display device according to various disclosed embodiments of the present disclosure.

FIG. 23 is a schematic structural diagram of a display device 200 provided by embodiments of the present disclosure. The display device 200 includes the display panel 100 described in the above embodiments of the present disclosure. The display device 200 may be any display device with display functions, such as a touch screen, a mobile phone, a tablet computer, a notebook computer, an electronic book, or a television.

The above has introduced in detail a display panel, its control method, and a display device provided by the present disclosure. The present disclosure uses specific examples to illustrate the principles and implementation methods. The description of the above embodiments is only used to help understand the method and core ideas of the present disclosure. For those of ordinary skill in the art, there will be changes in specific implementations and application scopes based on ideas of the present disclosure. Thus, the contents of the description should not be construed as limitations of the present disclosure.

It should be noted that each embodiment in this disclosure is described in a progressive manner. Each embodiment focuses on the differences from other embodiments. The same and similar parts between various embodiments can be referred to each other. For a device disclosed in an embodiment, since it corresponds to a method disclosed in the embodiment, the description may be relatively simple. Descriptions in the method section may contain relevant details.

Notably in the above description, relational terms such as "first" and "second" are only used to distinguish one entity or operation from another entity or operation without necessarily requiring or implying any such actual relationship or sequence between these entities or operations. The terms "comprises," "includes," or any other variation thereof are intended to cover a non-exclusive inclusion such that a process, method, article, or apparatus not only includes a list of those elements, but also includes other elements not expressly listed, or elements inherent in such process, method, article, or apparatus. Without further limitation, an element defined by a statement "comprises a . . . " does not exclude the presence of additional identical elements in the process, method, article, or apparatus that includes the stated element.

The above are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the application. The present disclosure is therefore not to be limited to the embodiments described herein but is to be accorded the widest scope consistent with the principles and novel features disclosed herein.

What is claimed is:

1. A display panel, comprising:
an array MUX test circuit;
a driver chip;
a plurality of data signal lines;
a plurality of touch signal lines; and
a plurality of second switches, wherein the array MUX test circuit includes:
a plurality of first solder pads;
a plurality of second solder pads;
a plurality of first switches; and
N clock signal input terminals, wherein N is a positive integer larger than or equal to two;
wherein a target unit includes N first solder pads of the plurality of first solder pads, N first switches of the plurality of first switches, and one of the plurality of second solder pads, the N first solder pads of the plurality of first solder pads are electrically connected to first terminals of the N first switches of the plurality of first switches in the target unit in a one-to-one correspondence, second terminals of the N first switches of the plurality of first switches are each electrically connected to the one of the plurality of second solder pads, control terminals of the N first switches of the plurality of first switches are electrically connected to the N clock signal input terminals in a one-to-one correspondence, one end of one of the plurality of data signal lines is electrically connected to one of the plurality of first solder pads, another end of the one of the plurality of data signal lines extends to a display area of the display panel; and wherein in the target unit there is at least one connection path between one of the plurality of first solder pads and one of the plurality of first switches and the at least one connection path includes one of the plurality of second switches connected in series, one end of one of the plurality of touch signal lines is electrically connected to a first terminal of one of the plurality of first switches in one of a plurality of target connection paths, the target connection path is a connection path that includes one of the plurality of second switches connected in series and there is at least one target connection path in the target unit, another end of the one of the plurality of touch signal lines extends toward the display area of the display panel and is electrically connected to a touch electrode block, the driver chip is electrically connected to the array MUX test circuit through the one of the plurality of second solder pads, and in a touch driving mode of the display panel, the plurality of second switches are in an off state and the driver chip sends a touch signal to one of the plurality of touch signal lines.

2. The display panel according to claim 1, wherein a second switch of the plurality of second switches is connected in series in a connection path between each of the plurality of first solder pads and a first switch of the plurality of first switches in the target unit.

3. The display panel according to claim 1, wherein there is at least one target connection path not connected to any of the plurality of touch signal lines between two target connection paths connected respectively with one of the plurality of touch signal lines in the target unit.

4. The display panel according to claim 1, wherein in the target unit there is at least one connection path that is connected with a second switch of the plurality of second switches and between a first solder pad of the plurality of first solder pads and a first switch of the plurality of first switches, and the at least one connection path is between two connection paths that are not connected to any of the plurality of second switches.

5. The display panel according to claim 1, wherein each target connection path correspondingly connects with a touch signal line of the plurality of touch signal lines.

6. The display panel according to claim 1, wherein a solder pad of the N first solder pads is electrically connected to a first terminal of one of the N first switches through a first signal line of the plurality of data signal lines, and an end of a touch signal line of the plurality of touch signal lines is short-circuited with the first signal line of the plurality of data signal lines.

7. The display panel according to claim 1, wherein a touch signal line of the plurality of touch signal lines is between two adjacent first solder pads of the plurality of first solder pads.

8. The display panel according to claim 7, wherein a first number of touch signal line of the plurality of touch signal lines between two adjacent first ones of the plurality of first solder pads is H1, a second number of touch signal line of the plurality of touch signal lines between two adjacent second ones of the plurality of first solder pads is H2, and H1 is not equal to H2.

9. The display panel according to claim 1, wherein the array MUX test circuit further includes:
a plurality of third solder pads, wherein the plurality of third solder pads and the plurality of first solder pads are on a same side of the array MUX test circuit, and one or more of the plurality of third solder pads have no power connection.

10. The display panel according to claim 9, wherein a touch signal line of the plurality of touch signal lines is between two adjacent ones of the plurality of third solder pads.

11. The display panel according to claim 10, wherein a portion of the plurality of touch signal lines between two adjacent ones of the plurality of third solder pads has a quantity Y1, another portion of the plurality of touch signal lines between two adjacent ones of the plurality of third solder pads has a quantity Y2, and Y1 is not equal to Y2.

12. The display panel according to claim 9, wherein a portion of the plurality of touch signal lines are between two adjacent ones of the plurality of first solder pads, and another portion of the plurality of touch signal lines are between two adjacent ones of the plurality of third solder pads.

13. The display panel according to claim 12, wherein the portion of the plurality of touch signal lines between the two adjacent ones of the plurality of first solder pads has a quantity W1, the other portion of the plurality of touch signal lines between the two adjacent ones of the plurality of third solder pads has a quantity W2, and W1 is not equal to W2.

14. The display panel according to claim 9, wherein the plurality of third solder pads are in a first layer, the plurality of touch signal lines are in a second layer different from the first layer, and an orthographic projection of the plurality of touch signal lines on a plane where the display panel is located overlaps with an orthographic projection of the plurality of third solder pads on the plane where the display panel 100 is located.

15. The display panel according to claim 9, wherein the plurality of third solder pads are connected in series to touch signal lines of the plurality of touch signal lines, respectively.

16. The display panel according to claim 1, wherein a plurality of clock signals received by the N clock signal input terminals are high-level signals or low-level signals with different timings.

17. The display panel according to claim 1, wherein both the plurality of first switches and the plurality of second switches include PMOS transistors.

18. A method for controlling a display panel, wherein the display panel comprises:
an array MUX test circuit;
a driver chip;
a plurality of data signal lines;
a plurality of touch signal lines; and
a plurality of second switches, wherein the array MUX test circuit includes:
a plurality of first solder pads;
a plurality of second solder pads;
a plurality of first switches; and
N clock signal input terminals, wherein N is a positive integer larger than or equal to two;
wherein a target unit includes N first solder pads of the plurality of first solder pads, N first switches of the plurality of first switches, and one of the plurality of second solder pads, the N first solder pads of the plurality of first solder pads are electrically connected to first terminals of the N first switches of the plurality of first switches in the target unit in a one-to-one correspondence, second terminals of the N first switches of the plurality of first switches are each electrically connected to the one of the plurality of second solder pads, control terminals of the N first switches of the plurality of first switches are electrically connected to the N clock signal input terminals in a one-to-one correspondence, one end of one of the plurality of data signal lines is electrically connected to one of the plurality of first solder pads, another end of the one of the plurality of data signal lines extends to a display area of the display panel; and wherein in the target unit there is at least one connection path between one of the plurality of first solder pads and one of the plurality of first switches and the at least one connection path includes one of the plurality of second switches connected in series, one end of one of the plurality of touch signal lines is electrically connected to a first terminal of one of the plurality of first switches in one of a plurality of target connection paths, the target connection path is a connection path that includes one of the plurality of second switches connected in series and there is at least one target connection path in the target unit, another end of the one of the plurality of touch signal lines extends toward the display area of the display panel and is electrically connected to a touch electrode block, the driver chip is electrically connected to the array MUX test circuit through the one of the plurality of second solder pads, and in a touch driving mode of the display panel, the plurality of second switches are in an off state and the driver chip sends a touch signal to one of the plurality of touch signal lines, the method comprises:
in a touch driving mode of the display panel, controlling a second switch of the plurality of second switches to be in an off state; and
controlling the driver chip to send a touch signal to a touch signal line of the plurality of touch signal lines.

19. A display device, comprising:
a display panel, wherein the display panel comprises:
an array MUX test circuit;
a driver chip;
a plurality of data signal lines;
a plurality of touch signal lines; and
a plurality of second switches, wherein the array MUX test circuit includes:
a plurality of first solder pads;
a plurality of second solder pads;
a plurality of first switches; and
N clock signal input terminals, wherein N is a positive integer larger than or equal to two;
wherein a target unit includes N first solder pads of the plurality of first solder pads, N first switches of the plurality of first switches, and one of the plurality of second solder pads, the N first solder pads of the plurality of first solder pads are electrically connected to first terminals of the N first switches of the plurality of first switches in the target unit in a one-to-one correspondence, second terminals of the N first switches of the plurality of first switches are each electrically connected to the one of the plurality of second solder pads, control terminals of the N first switches of the plurality of first switches are electrically connected to the N clock signal input terminals in a one-to-one correspondence, one end of one of the plurality of data signal lines is electrically connected to one of the plurality of first solder pads, another end of the one of the plurality of data signal lines extends to a display area of the display panel; and wherein in the target unit there is at least one connection path between one of the plurality of first solder pads and one of the plurality of first switches and the at least one connection path includes one of the plurality of second switches connected in series, one end of one of the plurality of touch signal lines is electrically connected to a first terminal of one of the plurality of first switches in one of a plurality of target connection paths, the target connection path is a connection path that includes one of the plurality of second switches connected in series and there is at least one target connection path in the target unit, another end of the one of the plurality of touch signal lines extends toward the display area of the display panel and is electrically connected to a touch electrode block, the driver chip is electrically connected to the array MUX test circuit through the one of the plurality of second solder pads, and in a touch driving mode of the display panel, the plurality of second switches are in an off state and the driver chip sends a touch signal to one of the plurality of touch signal lines.

* * * * *